US012514598B2

(12) United States Patent
Clancy

(10) Patent No.: US 12,514,598 B2
(45) Date of Patent: Jan. 6, 2026

(54) GUIDE FOR JOINT FUSION COMPRESSION USING PLATES

(71) Applicant: DEPUY SYNTHES PRODUCTS, INC., Raynham, MA (US)

(72) Inventor: Kevin Clancy, West Chester, PA (US)

(73) Assignee: DEPUY SYNTHES PRODUCTS, INC., Raynham, MA (US)

( * ) Notice: Subject to any disclaimer, the term of this patent is extended or adjusted under 35 U.S.C. 154(b) by 328 days.

(21) Appl. No.: 18/166,887

(22) Filed: Feb. 9, 2023

(65) Prior Publication Data

US 2024/0268840 A1  Aug. 15, 2024

(51) Int. Cl.
| A61B 17/17 | (2006.01) |
| A61B 17/68 | (2006.01) |
| A61B 17/80 | (2006.01) |
| A61B 17/86 | (2006.01) |

(52) U.S. Cl.
CPC .......... *A61B 17/17* (2013.01); *A61B 17/1796* (2013.01); *A61B 17/68* (2013.01); *A61B 17/8014* (2013.01); *A61B 17/864* (2013.01); *A61B 2017/681* (2013.01)

(58) Field of Classification Search
CPC .. A61B 17/1796; A61B 17/1728; A61B 17/17
See application file for complete search history.

(56) References Cited

U.S. PATENT DOCUMENTS

| 3,727,611 | A | * | 4/1973 | Schultz | A61B 17/1721 |
| | | | | | 606/86 R |
| 9,936,995 | B2 | * | 4/2018 | Dacosta | A61B 17/8019 |
| 10,772,669 | B2 | | 9/2020 | Burckhardt | |
| 11,389,221 | B2 | | 7/2022 | Tyber | |
| 2009/0012571 | A1 | | 1/2009 | Perrow | |
| 2013/0172942 | A1 | | 7/2013 | Lewis | |
| 2016/0220286 | A1 | * | 8/2016 | Garvey | A61B 17/1728 |
| 2021/0077128 | A1 | | 3/2021 | Gonzalez-Hernandez | |
| 2022/0183733 | A1 | * | 6/2022 | Coale | A61B 17/8061 |
| 2022/0240991 | A1 | | 8/2022 | Zingalis | |

FOREIGN PATENT DOCUMENTS

EP  1878394 A3  5/2009
WO  WO-2021127161 A1 *  6/2021

OTHER PUBLICATIONS

International Search Report for corresponding PCT Application No. PCT/IB2024/050800 mailed on Mar. 27, 2024.

* cited by examiner

*Primary Examiner* — Christian A Sevilla
(74) *Attorney, Agent, or Firm* — Kramer & Amado, P.C.

(57) ABSTRACT

A drill guide, including: a handle; and a base connected to the handle, the base further including: a body; a lip on an outer surface of the body, the lip configured to interface an upper surface of a bone plate; a guide hole extending through the body from a first surface of the body to a second surface of the body; and a relief surface extending between the first surface of the body and the second surface of the body.

18 Claims, 15 Drawing Sheets

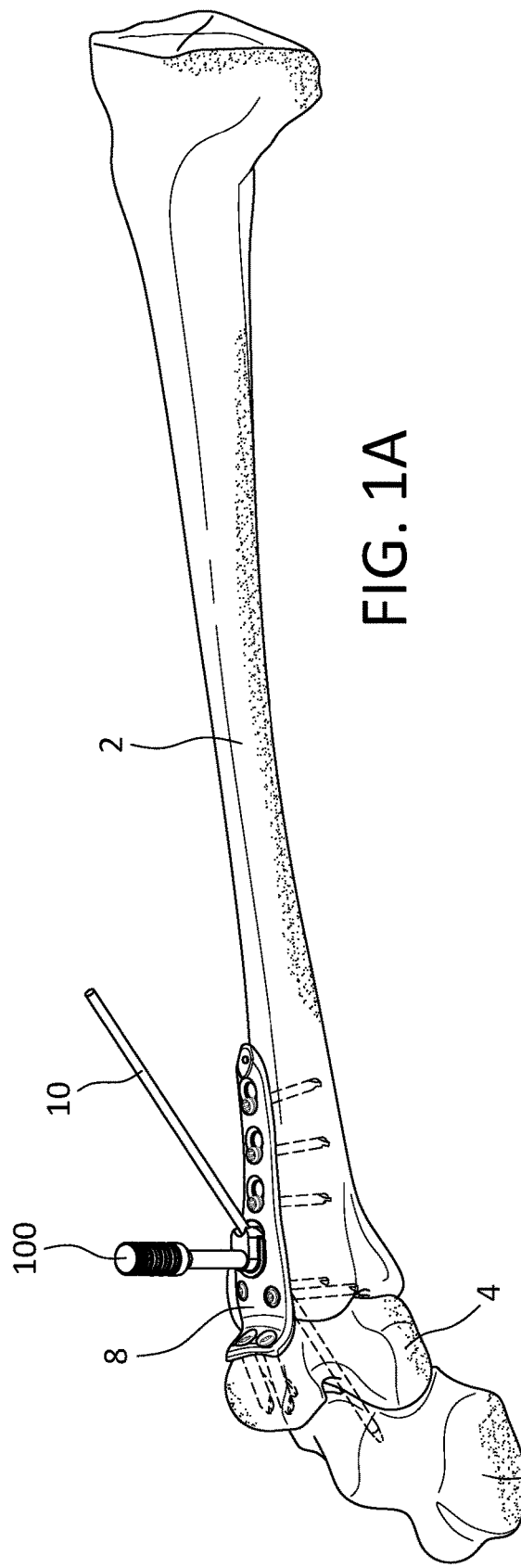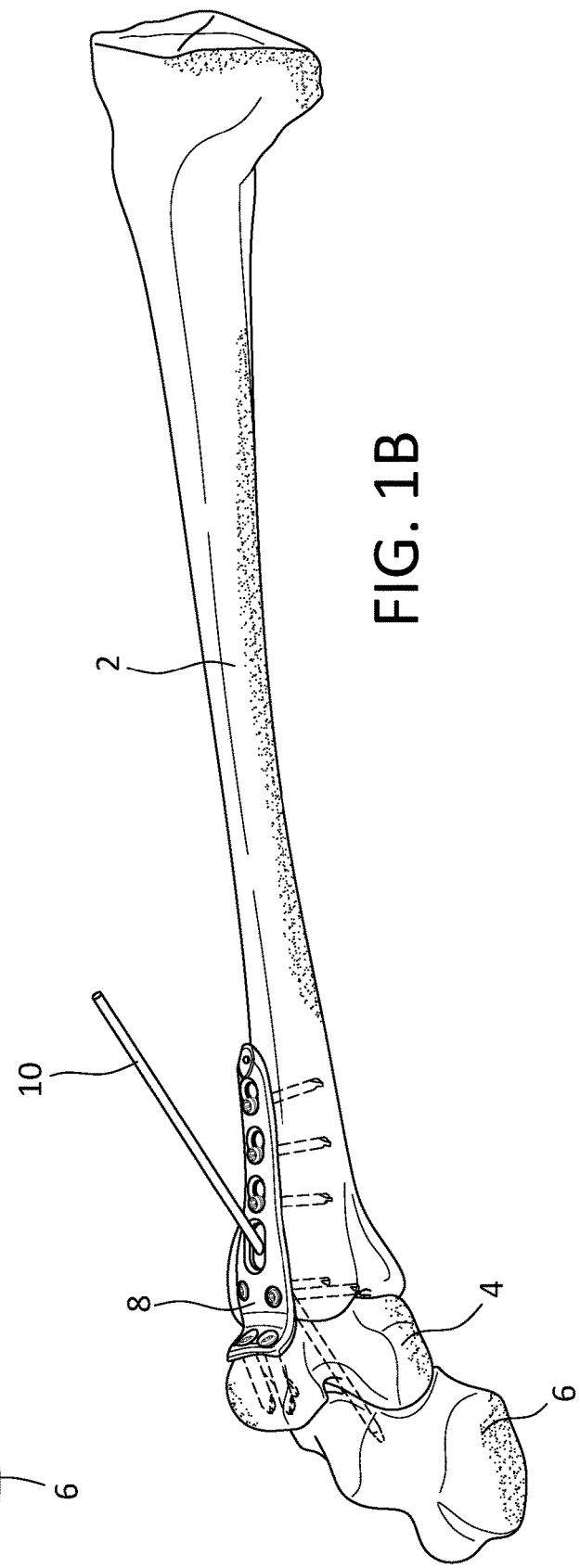

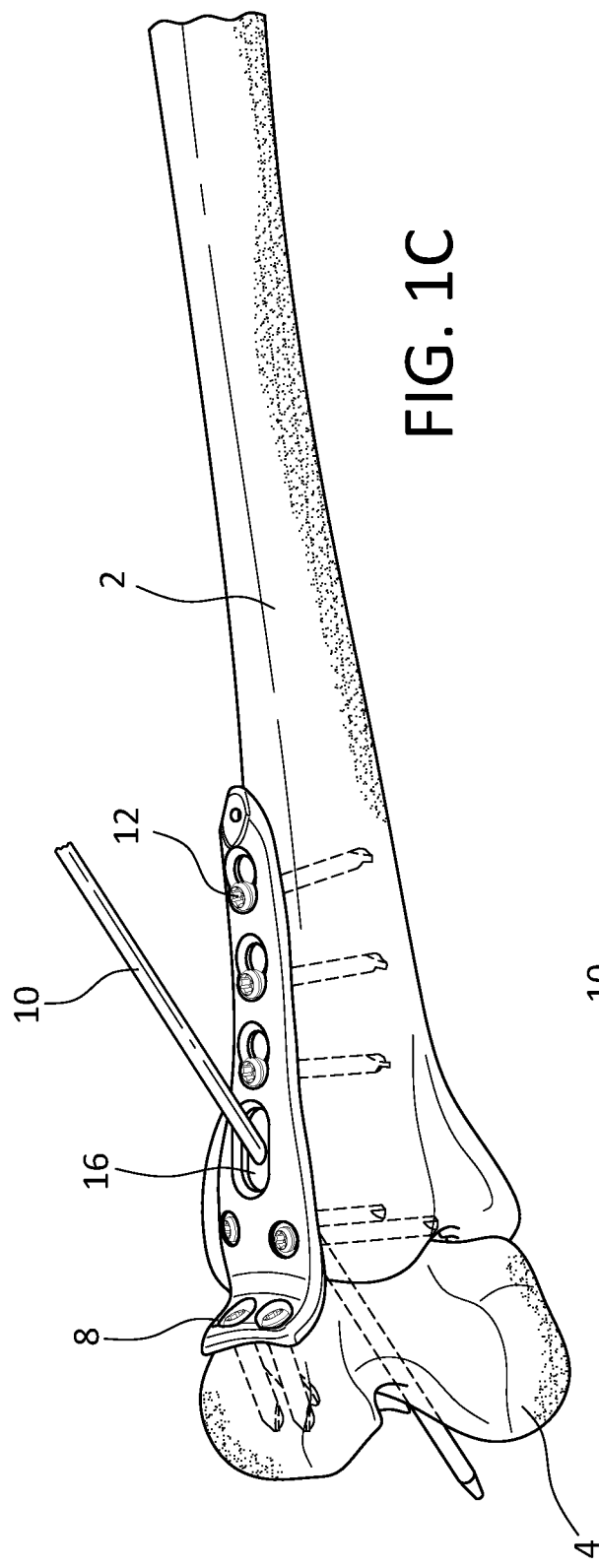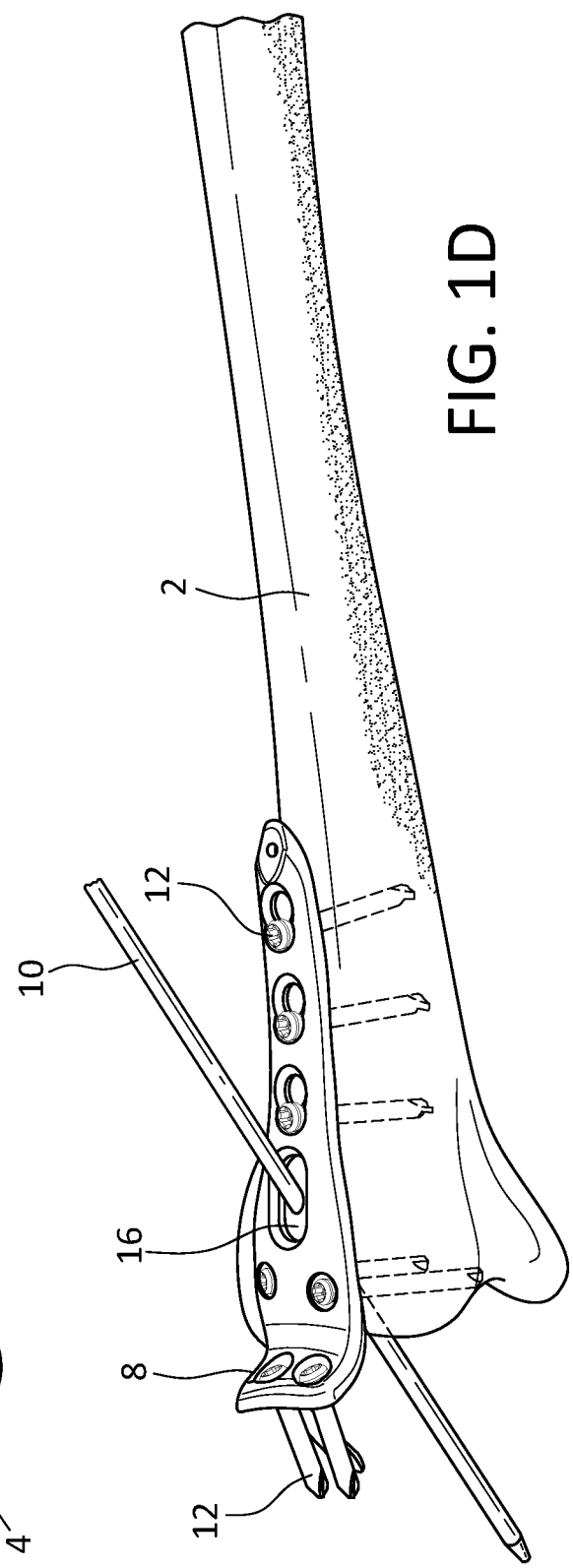

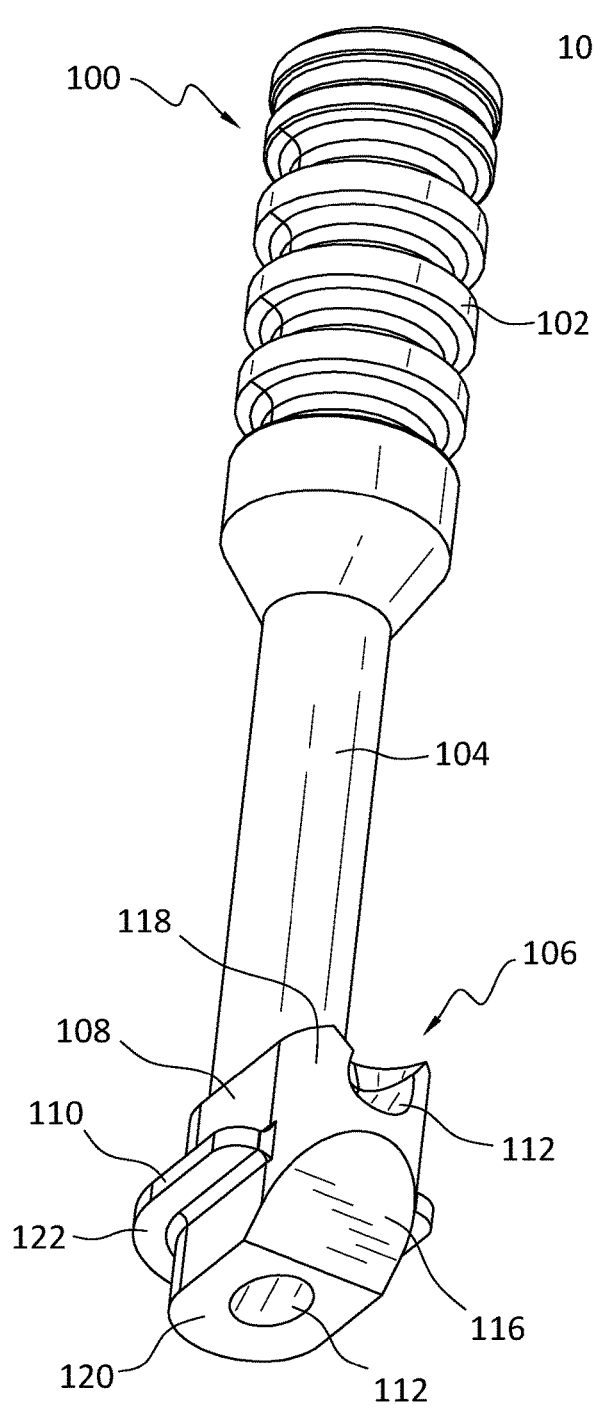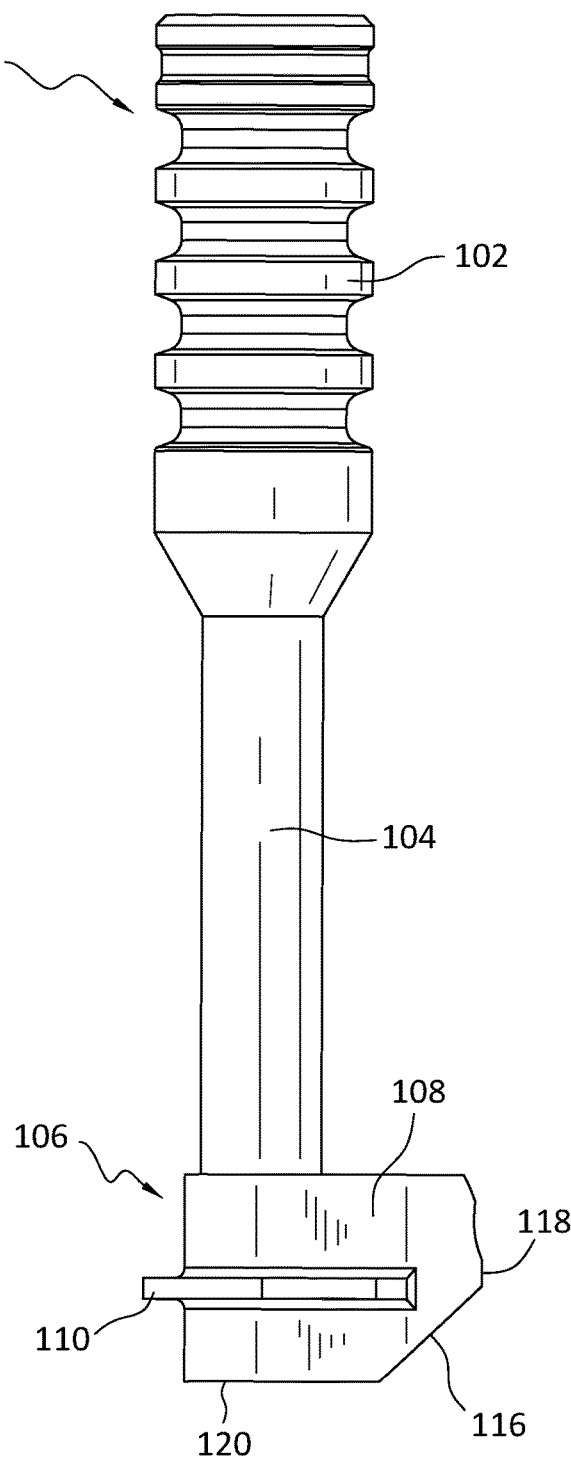
FIG. 3C
FIG. 3D

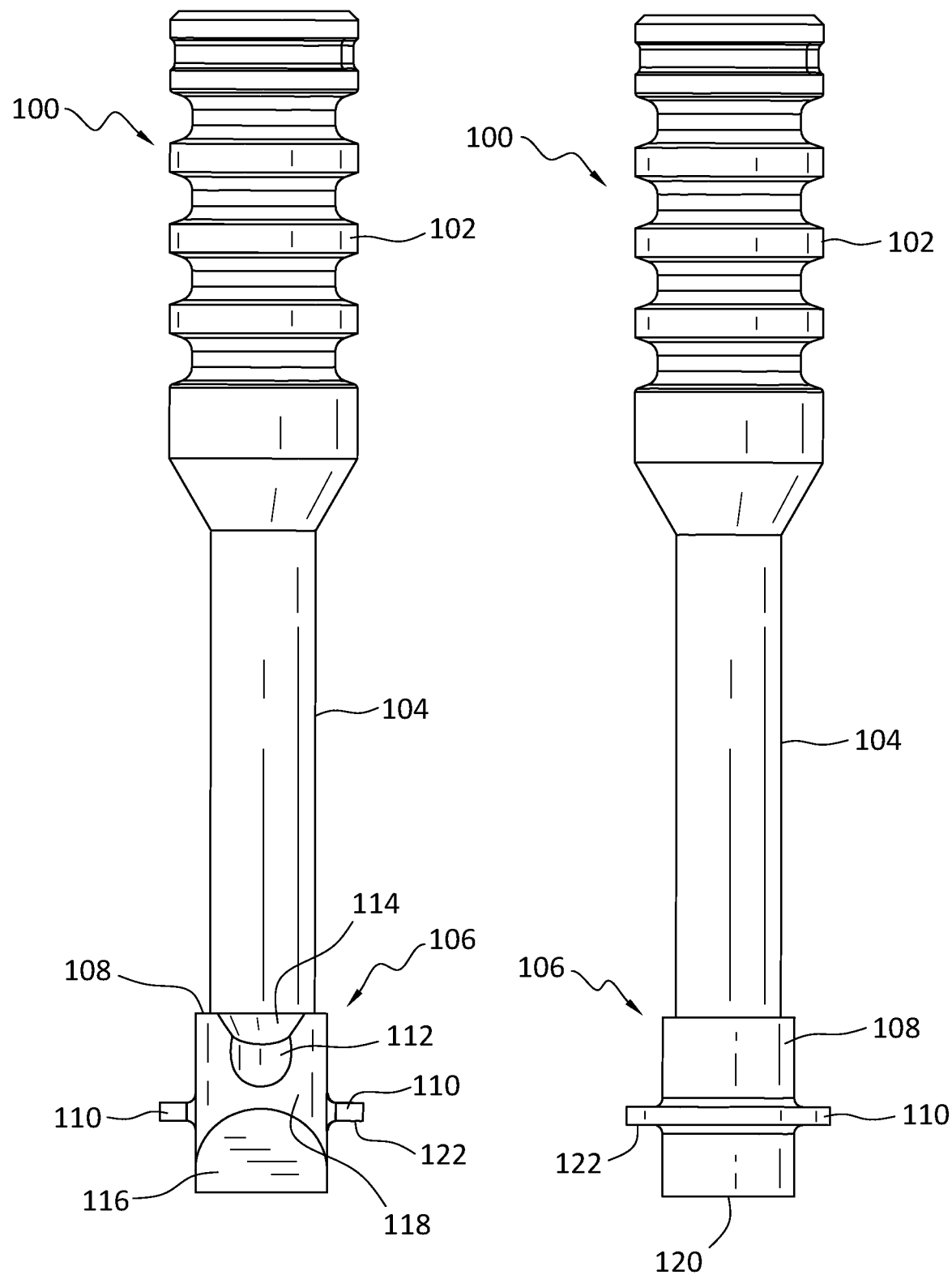

GUIDE FOR JOINT FUSION COMPRESSION USING PLATES

TECHNICAL FIELD

Various exemplary embodiments disclosed herein relate to a guide for joint fusion compression using plates.

BACKGROUND

When bone joints degenerate one proposed solution is to fuse the joint. A surgeon may open the joint and denude the cartilage by scraping the cartilage off of the mating surfaces of the bones. This gets down to what is known as bleeding bone. This causes the healing mechanism to believe that the joint is actually one broken bone and starts the healing process that will result in the joint being fused. The fusion may be facilitated by a bone plate and a compression screw. The bone plate attaches to one of the joint bones, and then the compression screw is inserted in a slot in the bone plate through the bones forming the joint. The compression screw fixes and compresses the joint so that as healing progresses the joint is fused.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments disclosed herein relate to a drill guide, including: a handle; and a base connected to the handle, the base further including: a body; a lip on an outer surface of the body, the lip configured to interface an upper surface of a bone plate; a guide hole extending through the body from a first surface of the body to a second surface of the body; and a relief surface extending between the first surface of the body and the second surface of the body.

Various embodiments are described, wherein the guide hole is configured to receive a guide wire.

Various embodiments are described, wherein the guide hole has a location and orientation configured to guide the guide wire to a specified location and orientation.

Various embodiments are described, wherein the relief surface is configured to facilitate removal of the drill guide from the bone plate after a guide wire is inserted through the guide hole.

Various embodiments are described, wherein the relief surface is flat and extends at an angle between the first surface and the second surface.

Various embodiments are described, wherein the body is configured with a shape that is complementary to the shape of a slot in the bone plate.

Various embodiments are described, wherein body is configured to align the guide hole to a specified location and orientation relative to the bone plate.

Various embodiments are described, wherein the lip is configured with a shape that is complementary to the shape of an upper surface of the bone plate.

Various embodiments are described, wherein the lip is configured to extend around the body from a first edge of the first surface to a second edge of the first surface.

Various embodiments are described, including a chamfer extending from a third surface of the body to the guide hole, wherein the third surface is opposite the second surface.

Further various embodiments relate to a method of placing a compression screw into a first bone and a second bone, including: attaching a bone plate to the first bone; inserting a drill guide in a slot of the bone plate, wherein the drill guide includes a guide hole with a specified location and orientation; inserting a guide wire in the guide hole; driving the guide wire into the first bone and the second bone; removing the drill guide from the slot of the bone plate by sliding the drill guide along the guide wire; sliding the compression screw over the guide wire into contact with the first bone; driving the compression screw into the first bone and the second bone; and removing the guide wire from the first bone and the second bone.

Various embodiments are described, wherein the drill guide includes: a handle; and a base connected to the handle, the base further including: a body; a lip on an outer surface of the body, the lip configured to interface an upper surface of a bone plate; and a relief surface extending between a first surface of the base and a second surface of the body, wherein the guide hole is configured to extend through the body from the first surface of the body to the second surface of the body.

Various embodiments are described, wherein the relief surface is configured to facilitate removal of the drill guide from the bone plate after a guide wire is inserted through the guide hole.

Various embodiments are described, wherein the relief surface is flat and extends at an angle between the first surface and the second surface.

Various embodiments are described, wherein the body is configured with a shape that is complementary to the shape of a slot in the bone plate.

Various embodiments are described, wherein body is configured to align the guide hole to a specified location and orientation relative to the bone plate.

Various embodiments are described, wherein the lip is configured with a shape that is complementary to the shape of an upper surface of the bone plate.

Various embodiments are described, wherein the lip is configured to extend around the body from a first edge of the first surface to a second edge of the first surface.

Various embodiments are described, including a chamfer extending from a third surface of the body to the guide hole, wherein the third surface is opposite the second surface.

BRIEF DESCRIPTION OF DRAWINGS

In order to better understand various exemplary embodiments, reference is made to the accompanying drawings in the following listing.

FIGS. 1A-1H illustrate the use of a plate to fuse an ankle joint.

FIGS. 3A-H illustrate a first embodiment of a guide.

To facilitate understanding, identical reference numerals have been used to designate elements having substantially the same or similar structure and/or substantially the same or similar function.

DETAILED DESCRIPTION

Figure 1F:
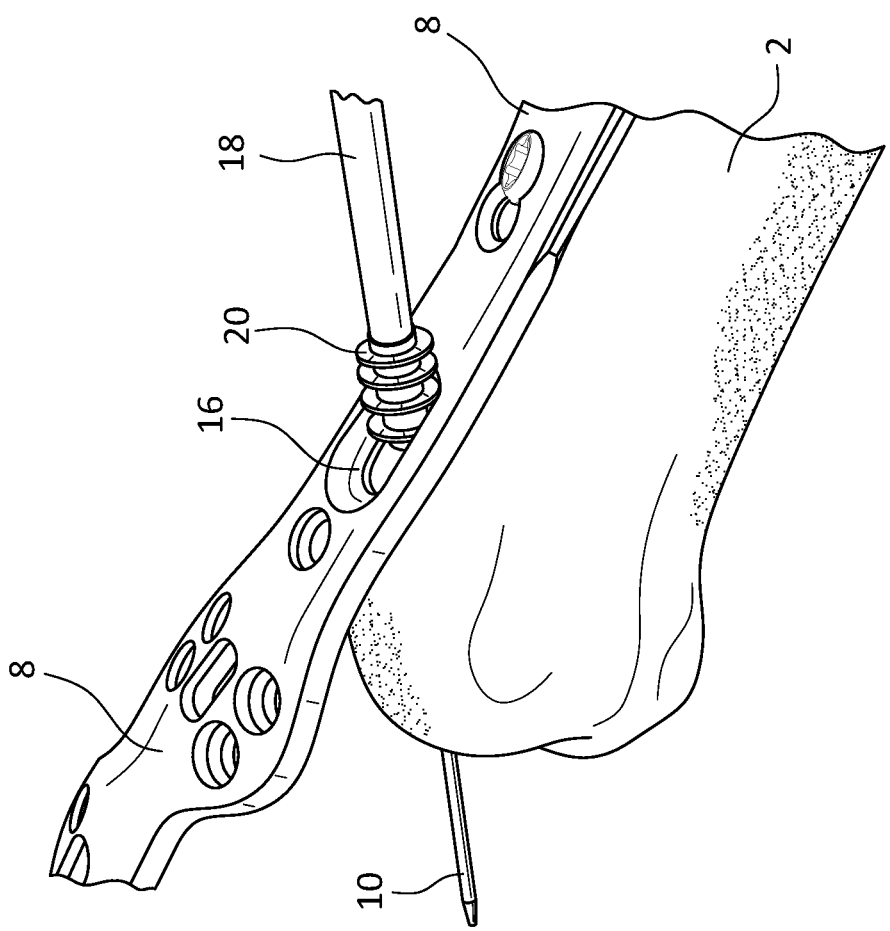

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Various illnesses and conditions may cause a joint to degrade. For example, diabetes and obesity can cause problems in hands, knees, and ankles. Over time, the nerves in or near the joint may go numb because of degradation of the soft tissues and nerves around the joint. Also, as the joint breaks down and the cartilage degrades, the surfaces of the joints may grow osteophytes that changes what should be a smooth strong surface into a rigid bumpy broken down surface. This leads to constant pain that is present even when the joint is not moving. One solution to overcome this joint degradation is to fuse the joint.

A surgeon may open the joint and denude the cartilage by scraping the cartilage off of the mating surfaces of the bones. This gets down to what is known as bleeding bone. This causes the healing mechanism to believe that the joint is actually one broken bone and starts the healing process that will result in the joint being fused. The fusion may be facilitated by a bone plate and a compression screw. The bone plate attaches to one of the joint bones, and then the compression screw is inserted in a slot in the bone plate through the bones forming the joint. The compression screw fixes and compresses the joint so that as healing progresses the joint is fused.

FIGS. 1A-1H illustrate the use of a plate to fuse an ankle joint. FIGS. 1A-1H include various views of the plate 8 attached to a tibia 2 along with the guide wire 10 and the guide 100. Further, various bones, i.e., tibia 2, talus 4, and calcaneus 6, are shown in the different views. In the different views various subsets of the different items are illustrated to show how the plate 8, guide wire 10, and guide 100 interact with the bones.

While the example of fusing an ankle joint is described, the embodiments described herein may be applied to other joints as well. The plate 8 is attached to tibia 2 and talus 4 using screws 12. The plate 8 has a plurality of screw holes 14 that accept screws 12. The plate 8 has a slot 16 that accepts a compression screw 18. The compression screw 18 extends through the tibia, talus 4, and calcaneus 6. The compression screw 18 has threads at its distal end that are configured to engage the calcaneus 6 in this application in order to apply compression across the tibia 2, talus 4, and calcaneus 6. The compression screw 18 needs to be inserted in a certain orientation in order to ensure that it engages the bones to be compressed properly. A guide wire 10 is used to guide the compression screw 18 along the desired trajectory through the bones. The compression screw 18 is cannulated so that it may slide over the guide wire 10 and thus be guided in the correct orientation. The surgeon uses a driver to place the guide wire 10 in the bones. During this operation the orientation of the guide wire 10 is important as is the location of the guide wire 10. For example, if the guide wire 10 is not in the proper orientation, the head of the compression screw 18 may protrude from the slot 16 and create discomfort for the patient. If the guide wire 10 is not in the proper location, the threads on the compression screw 18 may engage the edges of the slot 16 in the plate 8 and be damaged by the edges of the slot 16. Also, the head of the compression screw 18 may not fully enter the slot 16 in the plate 8 and also protrude from the slot 16 to create discomfort for the patient.

These problems may be solved by using a guide 100. The guide 100 is shaped to securely engage the slot 16 in a fixed location and orientation. The guide 100 includes a guide hole 112 with an orientation that allows for the guide wire 10 to be placed in the bones in the proper orientation and location. This ensures that the compression screw 18 will be in the correct orientation and location and will properly engage the plate 8 without damaging the threads on the compression screw 18 or protruding too far from the slot 16.

Figure 1E:
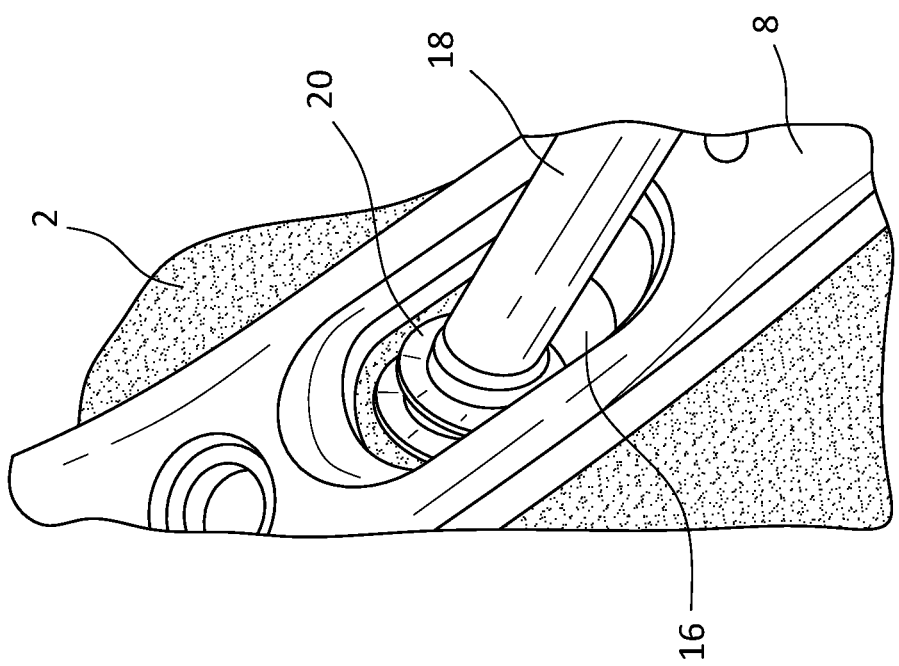
Figure 1H:
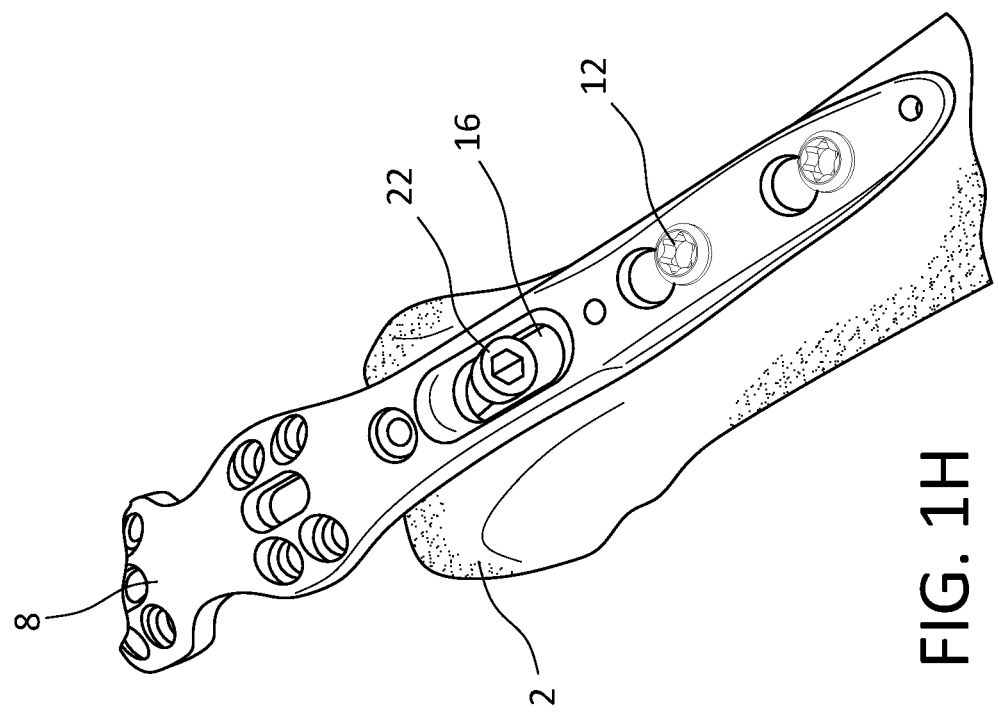
Figure 1G:
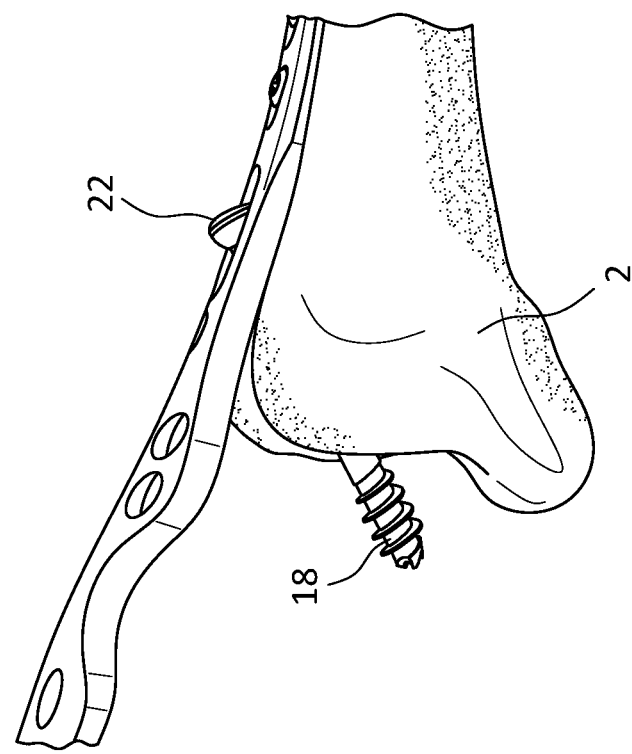

FIG. 1A illustrates the plate 8 attached to the tibia 2 and talus 4 with the guide 100 in the slot 16. The guide wire 10 is shown as inserted in the guide hole 112 and into the tibia 2, talus 4, and calcaneus 6. FIG. 1B shows the same view as FIG. 1A, but with the guide 100 removed. At this point, the compression screw 18 may be slid over the guide wire 10 and then screwed into the bones. In FIG. 1C the calcaneus 6 has been removed to show that the guide wire 10 extends into the calcaneus 6. In FIG. 1D the talus 4 has been removed to show that the guide wire 10 extending through the talus 4. FIG. 1E illustrates the compression screw 18 engaging the tibia 2. As can be seen, the compression screw threads 20 fit within the slot 16 without contacting the edges of the slot 16. This is because the guide 100 correctly positions the guide wire 10 in the slot 16. FIG. 1F illustrates a side view of the compression screw 18 being inserted into the tibia 2 over the guide wire 10. FIGS. 1G and 1H illustrate that the compression screw 18 completely inserted into the tibia 2 through the slot 16 and that the compression screw head 22 is properly set in the slot 16 without catching on the edge of the slot 16. This results in a low profile that reduces the irritation of to the patient due to the compression screw head 22. The guide 100 guides the guide wire 10 into the tibia 2 through the slot 16 at the desired angle and location.

Figure 2A:
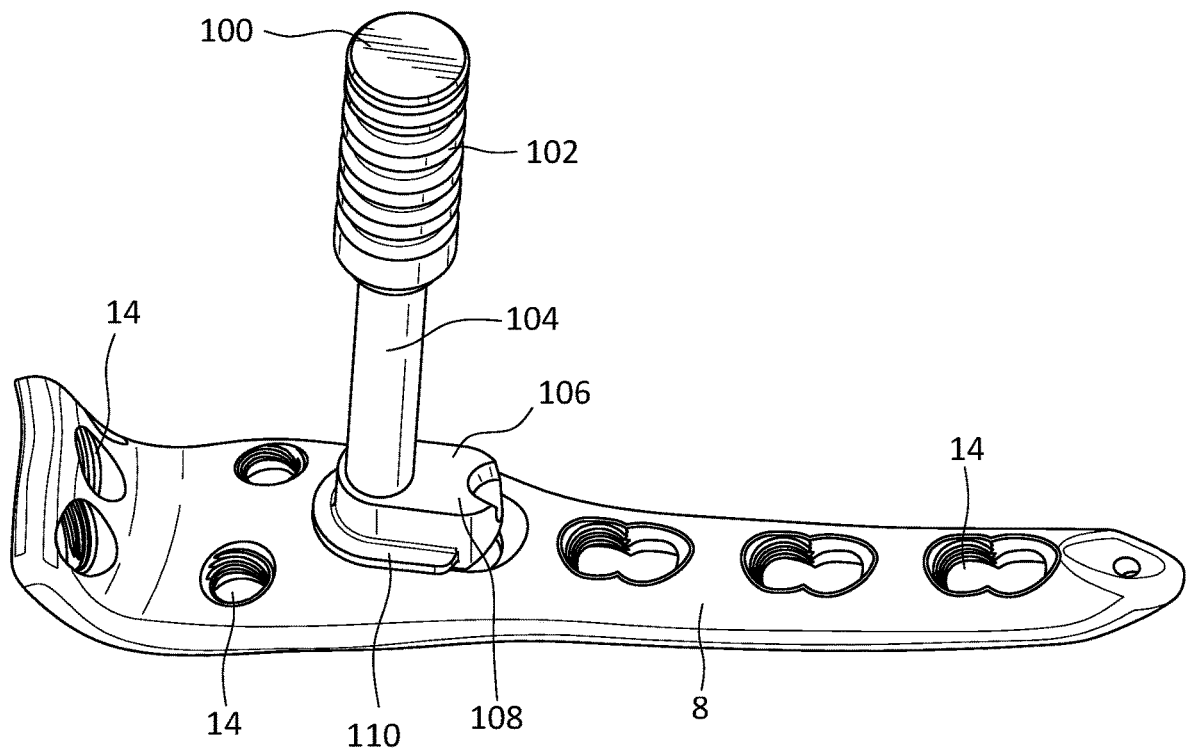
FIGS. 2A and 2B illustrate top perspective and bottom perspective views of the guide placed in the slot of the plate.
Figure 2B:
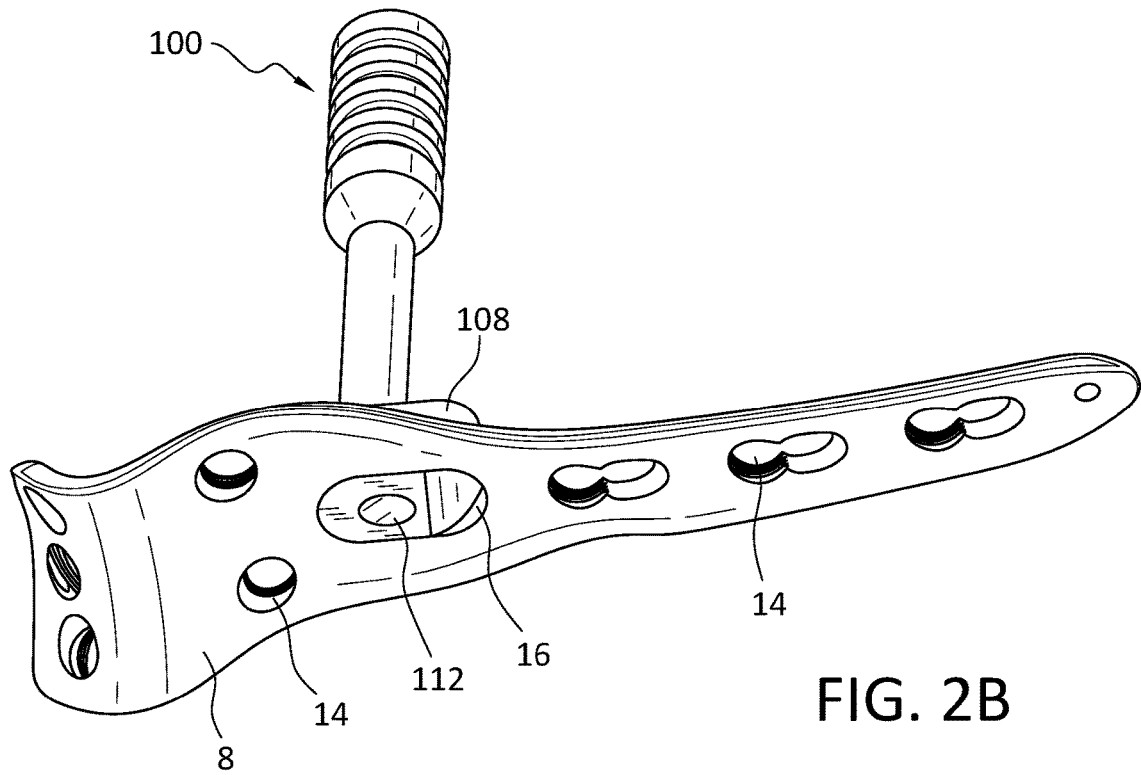
Figure 2C:
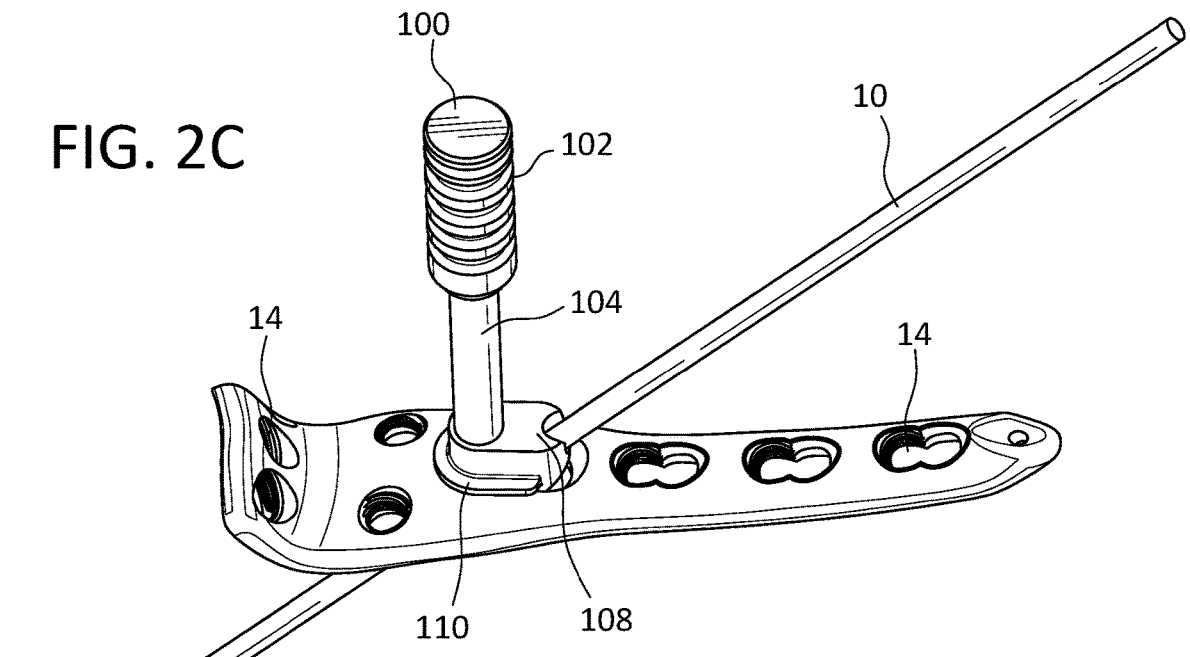
FIGS. 2C and 2D illustrate top perspective and bottom perspective view of the guide placed in the slot of the plate with the guide wire inserted through the guide.
Figure 2D:
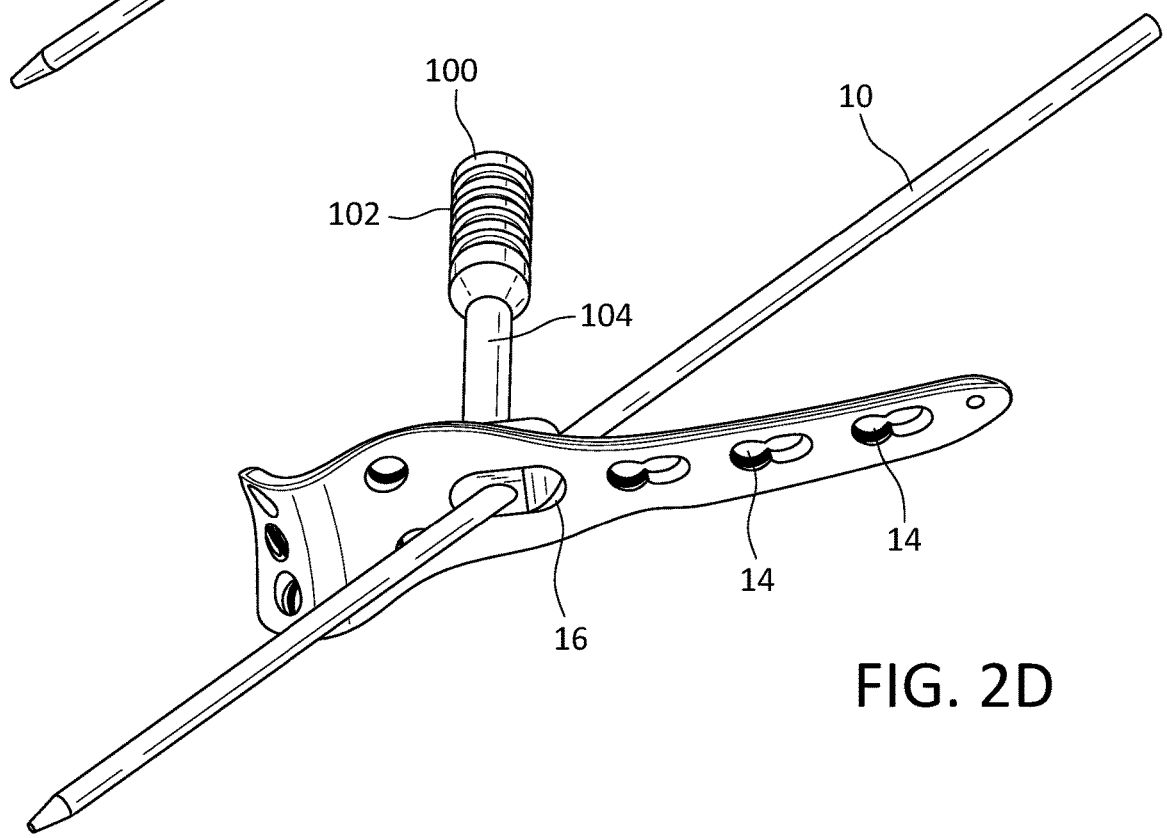
Figure 2E:
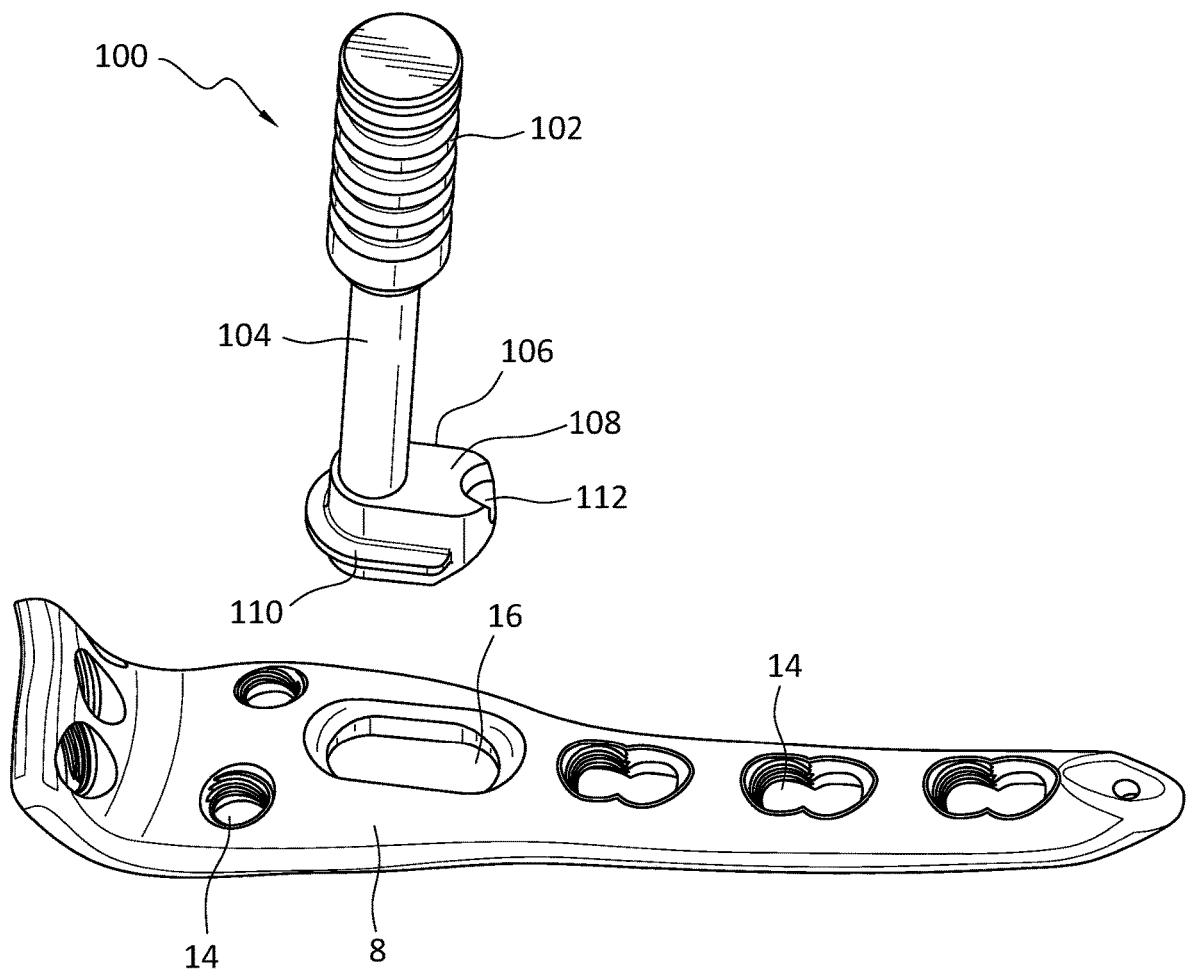
FIG. 2E illustrates the guide separated from the plate.

FIGS. 2A and 2B illustrate top perspective and bottom perspective views of the guide 100 placed in the slot 16 of the plate 8. With the guide 100 in the slot 16 the surgeon may now drive the guide wire 10 into tibia 2 via the guide hole 112. FIGS. 2C and 2D illustrate top perspective and bottom perspective view of the guide 100 placed in the slot 16 of the plate 8 with the guide wire 10 inserted through the guide 100. FIG. 2E illustrates the guide 100 separated from the plate 8. FIGS. 2A-2E illustrate how the guide 100 fits securely in the slot 16 of the plate 8 in a fixed location and orientation. This allows for the guide wire 10 to be driven into the tibia 2 at the correct location and orientation.

Figure 3A:
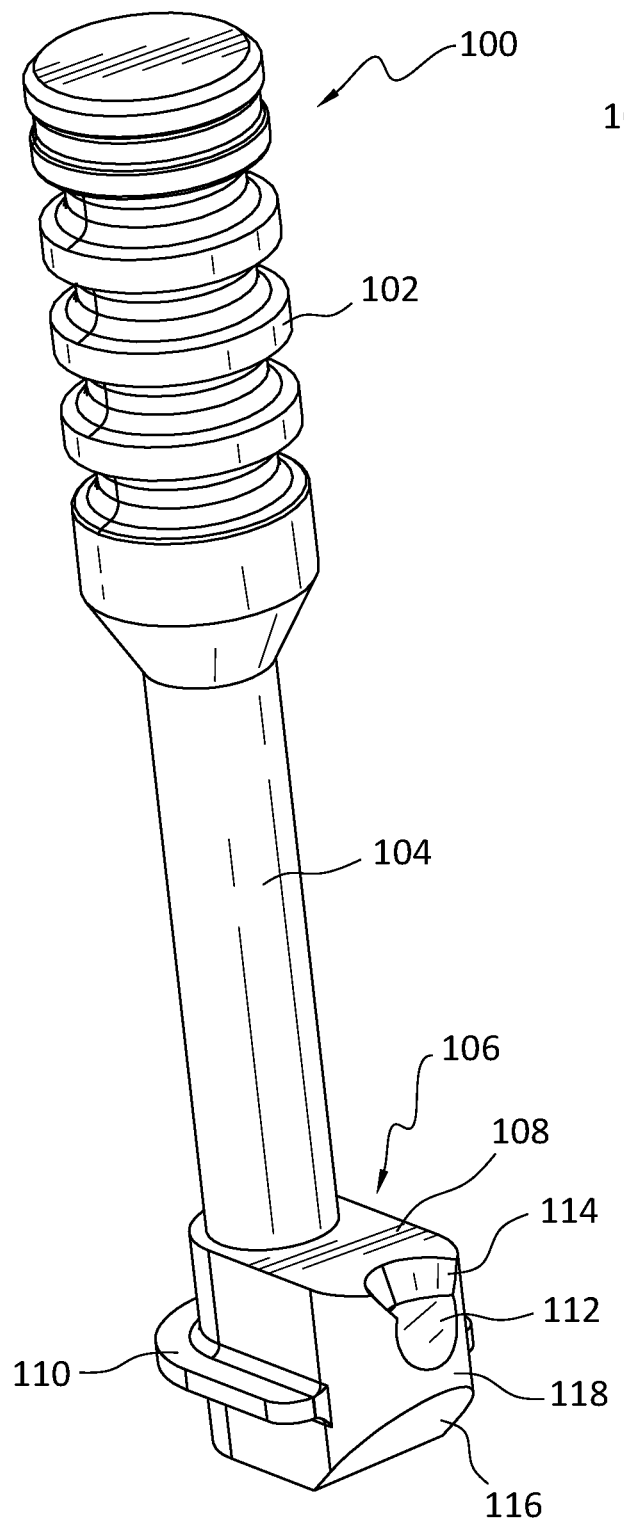
Figure 3B:
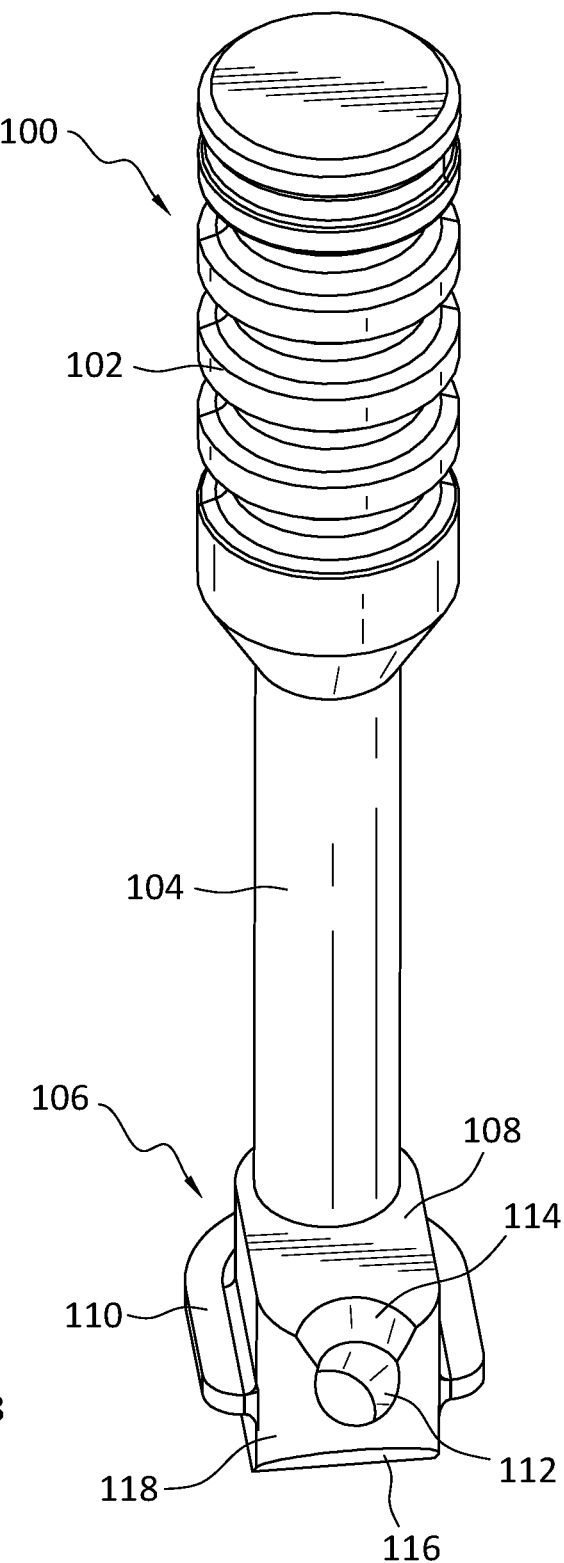
Figures 3G, 3H:
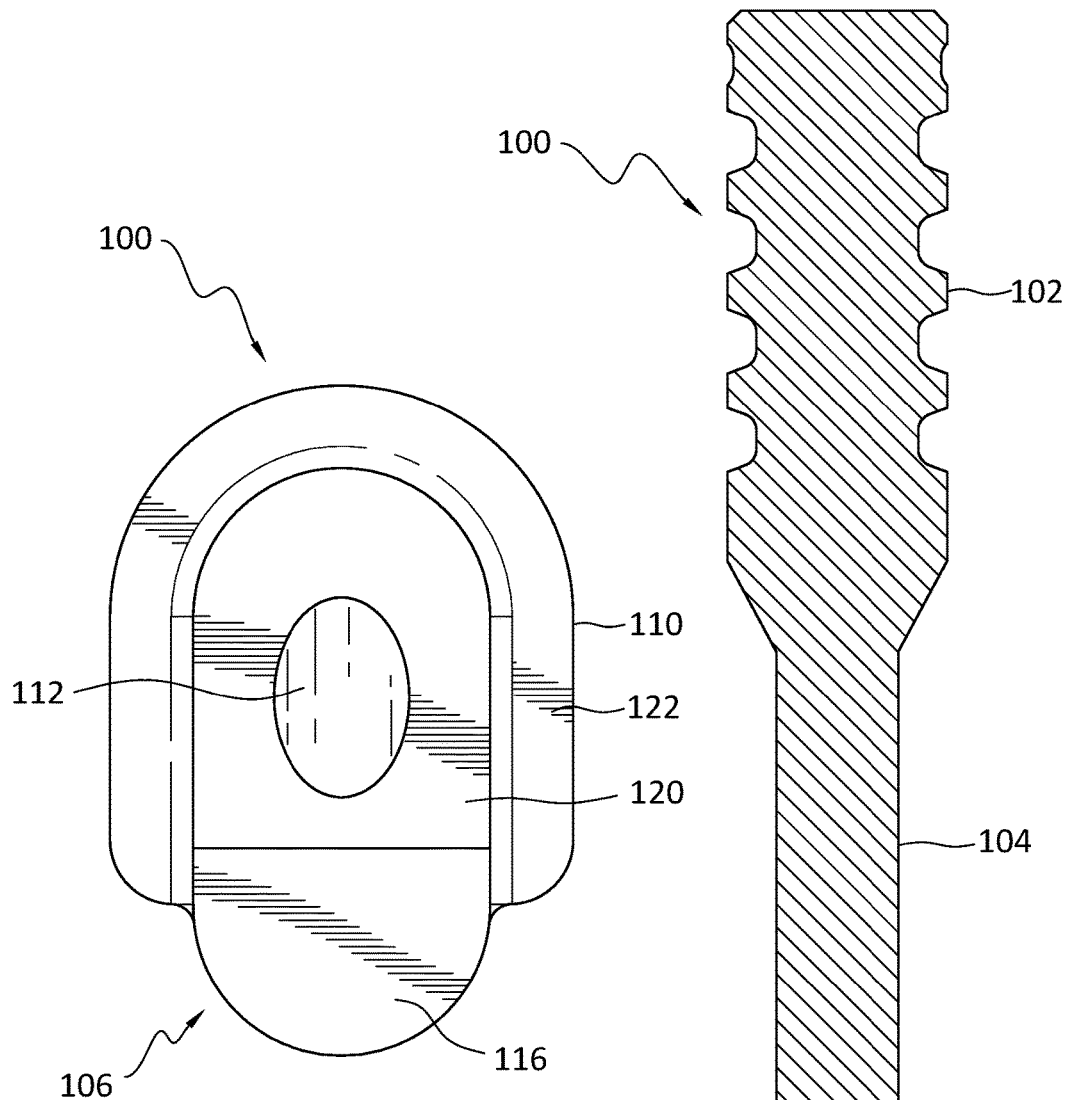

FIG. 3A illustrates a perspective view of the guide 100. FIG. 3B illustrates a top perspective view of the guide 100. FIG. 3C illustrates a bottom perspective view of the guide 100. FIG. 3D illustrates a side view of the guide 100. FIG. 3E illustrates a front view of the guide 100. FIG. 3F illustrates a back view of the guide 100. FIG. 3G illustrates a bottom view of the guide 100. FIG. 3H illustrates a cross-sectional view of the guide 100. The guide 100 includes a handle 102 connected to a rod 104 that is connected to base 106. The handle 102 allows the surgeon the grip the guide 100 and place the base 106 in the slot 16 of the plate 8. The rod 104 separates the handle 102 from the base 106 in order to make it easier for the surgeon to handle and place the guide 100 in the slot 16.

The base 106 includes a body 108, a lip 110, guide hole 112, chamfer 114, and relief surface 116. The body 108 has a shape that is complementary to the slot 16 in the plate 8 so that the body 108 fits securely in a desired position in the slot 16. In this example, the body 108 has a generally oval shape that conforms with the generally oval shape of the slot 16. Other shapes may be used as well. This allows the guide hole 112 to be in the correct position relative to the tibia 2 so that the guide wire 10 enters the tibia 2 in the correct location and orientation. Further, the guide hole 112 extends through the body 108 from a body front surface 118 to a body bottom surface 120. These may be first and second surfaces. The guide hole 112 extends through the body 108 at a correct angle that allows the guide wire 10 and compression screw 18 to extend thorough the tibia 2 and talus 4 into the calcaneus 6. The guide hole 112 exits the body bottom surface 120 so that when the compression screw 18 is placed over the guide wire 10 and screwed into the tibia 2, the compression screw 18 extends through the slot 16 without the compression screw threads 20 touching the edges of the slot 16. This prevents damage to the compression screw threads 20. Further, the guide hole 112 causes the compression screw head 22 to be in the correct location to reduce the profile of the compression screw head 22 in the plate 8. This reduces the chance for irritation to the patient.

The lip 110 extends around the body 108 on an outer surface of the body. In this example, the lip 110 extends around the body 108 from one edge of the body front surface 118 to a second edge of the body front surface 118. As a result the lip 110 does not extend across the body front surface 118. In other embodiments the lip 110 may extend completely around the body 108 in such a way that it does not interfere with guide hole 112 or relief surface 116. Further, the lip 110 could be made up of segments that are not contiguous, i.e., segments that are spread out around the body 108 to provide the needed support in engaging the top of the plate 8. The lip 110 is configured to engage an upper surface of the plate 8 surrounding the slot 16. The lip 110 is located a distance from the body bottom surface 120 to allow the body bottom surface 120 to just touch the tibia 2 or to allow for a gap between the body bottom surface 120 and the tibia 2. This helps to ensure that the guide wire 10 and the compression screw 18 are in the correct location and orientation. A bottom surface of the lip 110 may be shaped to conform to the upper surface of the plate 8 surrounding the slot 16. In this example, the lip bottom surface 122 of the lip 110 is flat.

The chamfer 114 extends from a top surface (or a third surface) of the base 106 to the guide hole 112. The chamfer 114 allows for the guide wire 10 to more easily be inserted into the guide hole 112. The chamfer 114 also allows for the guide 100 to be removed from the plate 8 along the guide wire 10 after the guide wire 10 has been driven into the tibia 2.

The relief surface 116 is an angled surface that extends from the body bottom surface 120 to the body front surface 118. The relief surface 116 allows for the guide 100 to be removed from the slot 16 of the plate 8 on long the guide wire 10 after the guide wire 10 has been driven into the tibia 2. The shape, location, and angle of the relief surface 116 are configured to allow for the body 108 to be securely placed in a fixed desired location in the slot 16 of the plate 8, but to allow for the guide 100 to be removed over the guide wire 10.

Figure 4A:
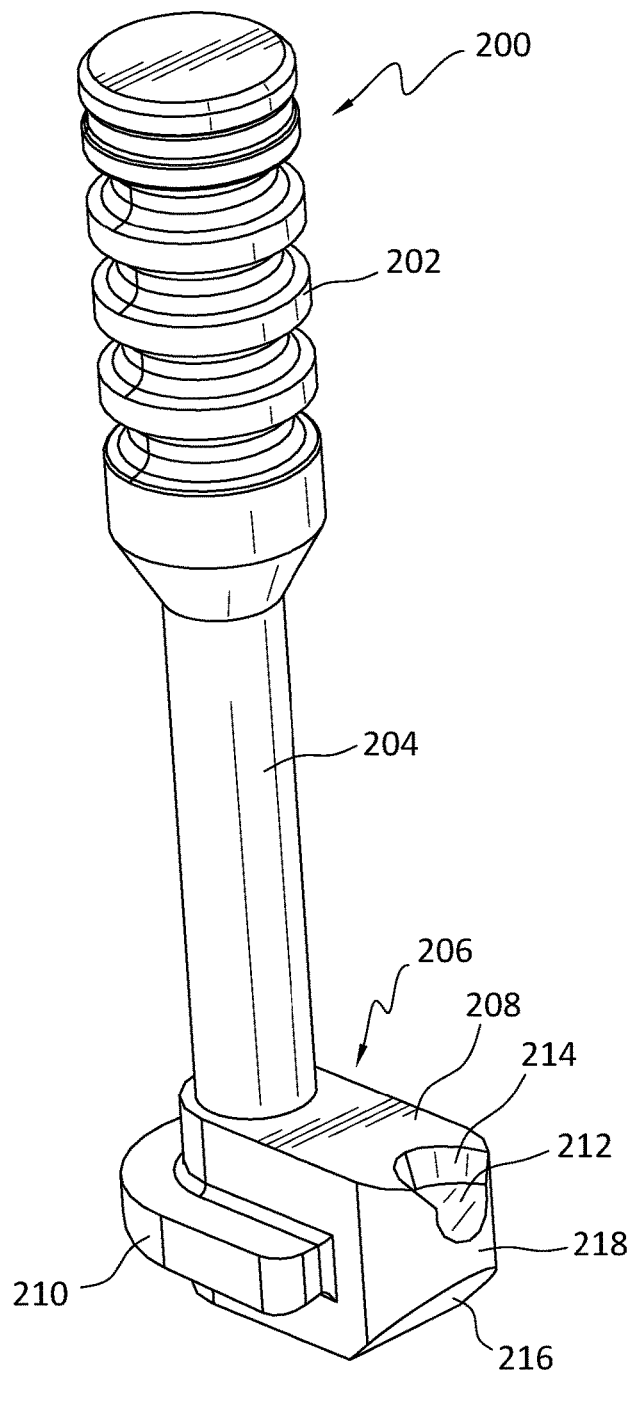
FIGS. 4A-H illustrate a second embodiment of a guide.
Figure 4B:
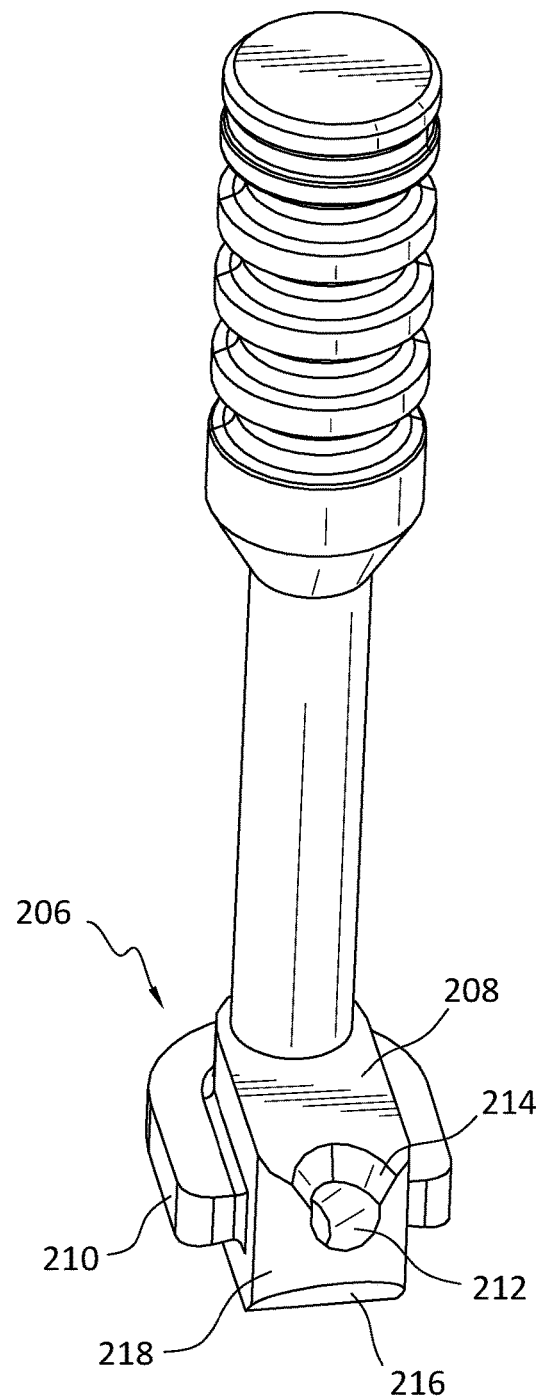
Figures 4C, 4D:
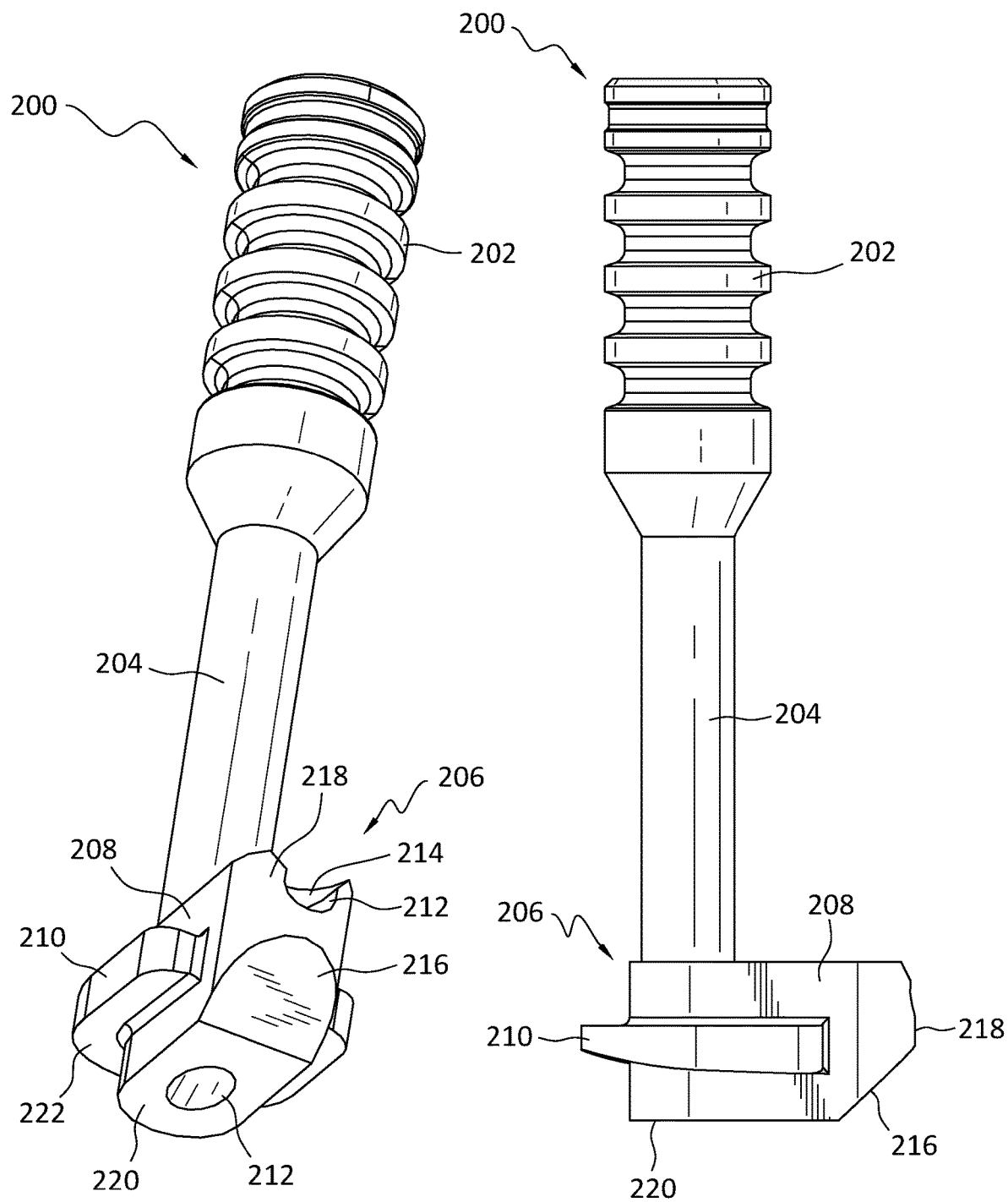
Figure 4E:
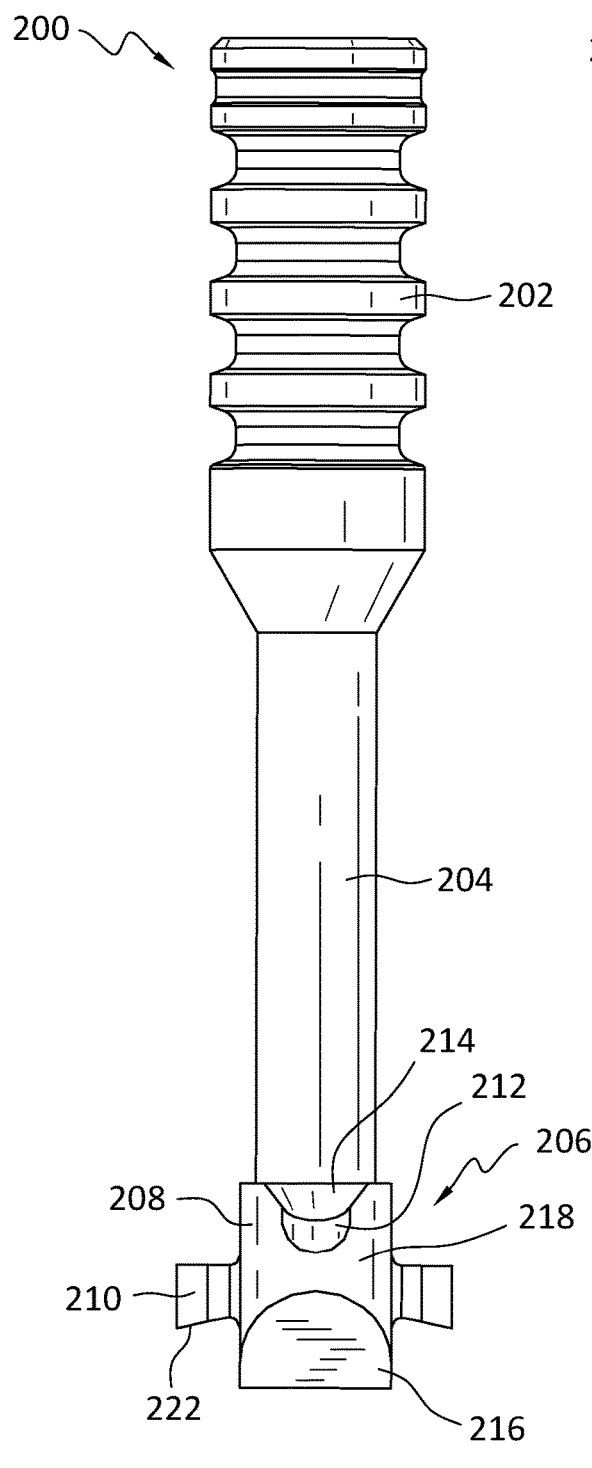
Figure 4F:
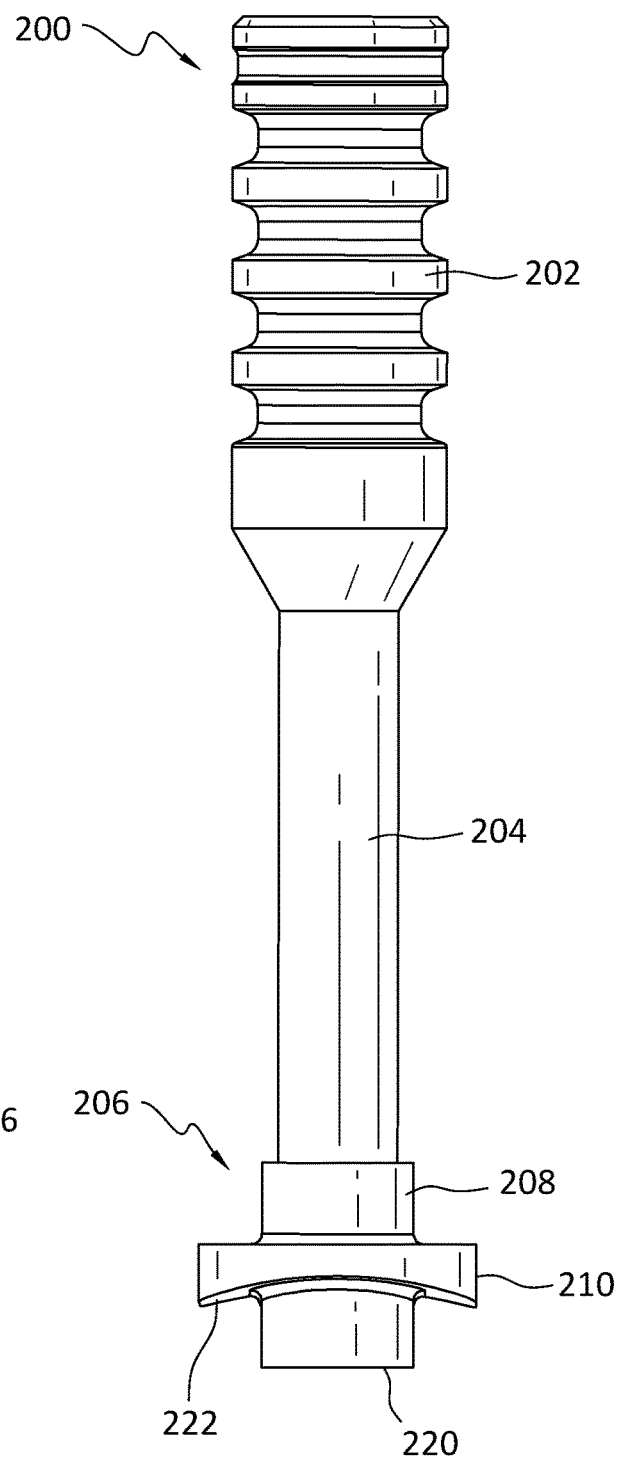
Figures 4G, 4H:
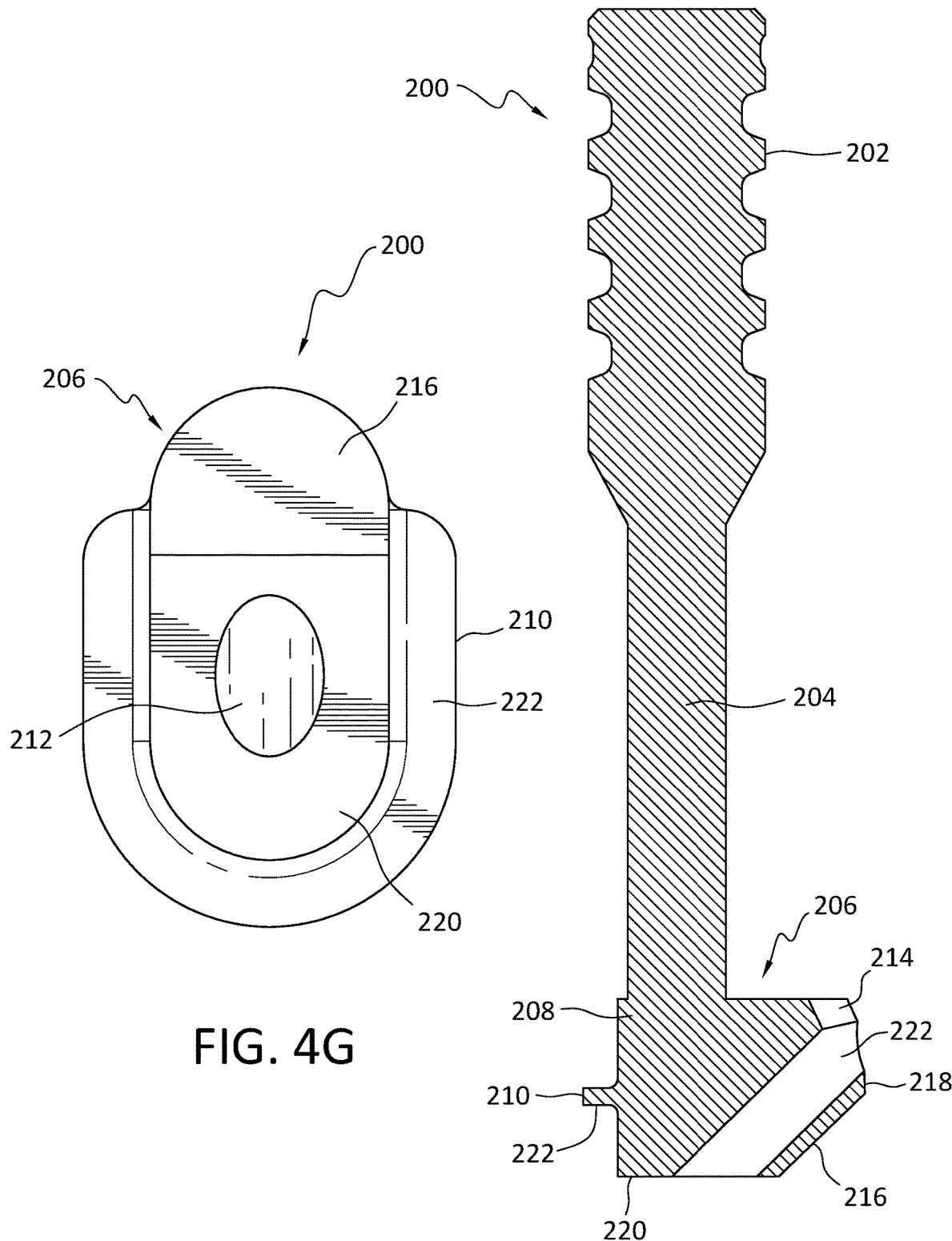

FIGS. 4A-H illustrate a second embodiment of a guide 200. FIG. 4A illustrates a perspective view of the guide 200. FIG. 4B illustrates a top perspective view of the guide 200. FIG. 4C illustrates a bottom perspective view of the guide 200. FIG. 4D illustrates a side view of the guide 200. FIG. 4E illustrates a front view of the guide 200. FIG. 4F illustrates a back view of the guide 200. FIG. 4G illustrates a bottom view of the guide 200. FIG. 4H illustrates a cross-sectional view of the guide 200. The guide 200 includes a handle 202 connected to a rod 104 that is connected to base 206. The handle 202 allows the surgeon the grip the guide 200 and place the base 206 in the slot 16 of the plate 8. The rod 104 separates the handle 202 from the base 206 in order to make it easier for the surgeon to handle and place the guide 200 in the slot 16.

The base 206 includes a body 208, a lip 210, guide hole 212, chamfer 214, and relief surface 216. The body 208 has a shape that is complementary to the slot 16 in the plate 8 so that the body 208 fits securely in a desired position in the slot 16. In this example, the body 208 has a generally oval shape that conforms with the generally oval shape of the slot 16. Other shapes may be used as well. This allows the guide hole 212 to be in the correct position relative to the tibia 2 so that the guide wire 10 enters the tibia 2 in the correct location and orientation. Further, the guide hole 212 extends through the body 208 from a body front surface 218 to a body bottom surface 220. These may be first and second surfaces. The guide hole 212 extends through the body 208 at a correct angle that allows the guide wire 10 and compression screw 18 to extend thorough the tibia 2 and talus 4 into the calcaneus 6. The guide hole 212 exits the body bottom surface 220 so that when the compression screw 18 is placed over the guide wire 10 and screwed into the tibia 2, the compression screw 18 extends through the slot 16 without the compression screw threads 20 touching the edges of the slot 16. This prevents damage to the compression screw threads 20. Further, the guide hole 212 causes the compression screw head 22 to be in the correct location to reduce the profile of the compression screw head 22 in the plate 8. This reduces the chance for irritation to the patient.

The lip 210 extends around the body 208 on an outer surface of the body. In this example, the lip 210 extends around the body 208 from one edge of the body front surface 218 to a second edge of the body front surface 218. As a result the lip 210 does not extend across the body front surface 218. In other embodiments the lip 210 may extend completely around the body 208 in such a way that it does not interfere with guide hole 212 or relief surface 216. Further, the lip 210 could be made up of segments that are not contiguous, i.e., segments that are spread out around the body 208 to provide the needed support in engaging the top of the plate 8. The lip 210 is configured to engage an upper surface of the plate 8 surrounding the slot 16. The lip 210 is located a distance from the body bottom surface 220 to allow the body bottom surface 220 to just touch the tibia 2 or to allow for a gap between the body bottom surface 220 and the tibia 2. This helps to ensure that the guide wire 10 and the compression screw 18 are in the correct location and orientation. A bottom surface of the lip 210 may be shaped to conform to the upper surface of the plate 8 surrounding the slot 16. In this example, the lip bottom surface 222 of the lip 210 is curved.

The chamfer 214 extends from a top surface (or a third surface) of the base 206 to the guide hole 212. The chamfer 214 allows for the guide wire 10 to more easily be inserted into the guide hole 212. The chamfer 214 also allows for the guide 200 to be removed from the plate 8 along the guide wire 10 after the guide wire 10 has been driven into the tibia 2.

The relief surface 216 is an angled surface that extends from the body bottom surface 220 to the body front surface 218. The relief surface 216 allows for the guide 200 to be removed from the slot 16 of the plate 8 on long the guide wire 10 after the guide wire 10 has been driven into the tibia 2. The shape, location, and angle of the relief surface 216 are configured to allow for the body 208 to be securely placed in a fixed desired location in the slot 16 of the plate 8, but to allow for the guide 200 to be removed over the guide wire 10.

Now a method for using the guide 100 will be described. This description also applies to guide 200. After preparing the surfaces of the first and second bones to be fused (if needed), the surgeon begins by placing the plate 8 on the first bone (in this specific example the tibia 2). The plate 8 is secured to the first bone using screws 12 place in at least two screw holes 14 in the plate 8. The surgeon may first predrill holes through the screw holes 14 in the plate 8 that will accept screws 12. Next, the surgeon places the guide 100 in the slot 16 of the plate 8. The surgeon then drives the guide wire 10 through the guide hole 112 in the guide 100 using a driver. The guide wire 10 is driven to the needed depth in order to capture and fuse the first and second bones. Then the surgeon removes the guide 100 from the plate 8 by sliding it along the guide wire 10. Next, the surgeon slides the compression screw 18 over the guide wire 10 and drives the compression screw 18 into the first and second bones. The compression screw 18 may be torqued to a desired value. The guide wire 10 may then be removed from the first and second bones. Finally, any remaining screws 12 may be placed in the plate 8, if needed.

While the drill guides 100 and 200 are described for use in fusing an ankle, the drill guides may be adapted for use in other joint fusion surgeries.

The drill guide embodiments described herein allow for the insertion of a compression screw in the correct location and orientation. The drill guides are designed to fit in the slot in the plate and to provide an opening that allows the guide wire to be driven into the bone at the correct location and orientation. This prevents the threads on the compression screw from being damaged by coming into contact with the sides of the slot in the place. It also ensures that the head of the compression screw properly seats in the slot of the plate so that the head of the compression screw does not unnecessarily protrude from the plate.

While each of the embodiments are described above in terms of their structural arrangements, it should be appreciated that the invention also covers the associated methods of using the embodiments described above.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications and combinations of the various embodiments can be affected while remaining within the spirit and scope of the invention. Accordingly, the foregoing disclosure, description, and figures are for illustrative purposes only and do not in any way limit the invention, which is defined only by the claims.

The invention claimed is:

1. A drill guide, comprising:
   a handle; and
   a base connected to the handle, the base further including:
      a body;
      a lip on an outer surface of the body, the lip configured to interface an upper surface of a bone plate;
      a guide hole extending through the body from a first surface of the body to a second surface of the body; and
      a relief surface extending between the first surface of the body and the second surface of the body.

2. The drill guide of claim 1, wherein the guide hole is configured to receive a guide wire.

3. The drill guide of claim 2, wherein the guide hole has a location and orientation configured to guide the guide wire to a specified location and orientation.

4. The drill guide of claim 1, wherein the relief surface is configured to facilitate removal of the drill guide from the bone plate after a guide wire is inserted through the guide hole.

5. The drill guide of claim 1, wherein the relief surface is flat and extends at an angle between the first surface of the body and the second surface of the body.

6. The drill guide of claim 1, wherein the body is configured with a shape that is complementary to the shape of a slot in the bone plate.

7. The drill guide of claim 5, wherein the body is configured to align the guide hole to a specified location and orientation relative to the bone plate.

8. The drill guide of claim 1, wherein the lip is configured with a shape that is complementary to the shape of an upper surface of the bone plate.

9. The drill guide of claim 1, wherein the lip is configured to extend around the body from a first edge of the first surface of the body to a second edge of the first surface of the body.

10. The drill guide of claim 1, comprising a chamfer extending from a third surface of the body to the guide hole, wherein the third surface of the body is opposite the second surface of the body.

11. A method of placing a compression screw into a first bone and a second bone, comprising:
   attaching a bone plate to the first bone;
   inserting a drill guide according to claim 1 in a slot of the bone plate, wherein the drill guide includes the guide hole;
   inserting a guide wire in the guide hole;
   driving the guide wire into the first bone and the second bone;
   removing the drill guide from the slot of the bone plate by sliding the drill guide along the guide wire;
   sliding the compression screw over the guide wire into contact with the first bone;
   driving the compression screw into the first bone and the second bone; and
   removing the guide wire from the first bone and the second bone.

12. The method of claim 11, wherein the relief surface of the drill guide is configured to facilitate removal of the drill guide from the bone plate after a guide wire is inserted through the guide hole.

13. The method of claim 11, wherein the relief surface of the drill guide is flat and extends at an angle between the first surface and the second surface.

14. The method of claim 11, wherein the body of the drill guide is configured with a shape that is complementary to the shape of a slot in the bone plate.

15. The method of claim 13, wherein the body of the drill guide is configured to align the guide hole to a specified location and orientation relative to the bone plate.

16. The method of claim 11, wherein the lip is configured with a shape that is complementary to the shape of an upper surface of the bone plate.

17. The method of claim 11, wherein the lip is configured to extend around the body from a first edge of the first surface to a second edge of the first surface.

18. The method of claim 11, wherein the drill guide further comprises a chamfer extending from a third surface of the body to the guide hole, wherein the third surface of the body is opposite the second surface of the body.

\* \* \* \* \*